(12) United States Patent
Kamm (10) Patent No.: US 10,518,832 B2
(45) Date of Patent: Dec. 31, 2019

(54) MOBILE RETAIL STORE STRUCTURE

(71) Applicant: Joel Kamm, Newton, MA (US)

(72) Inventor: Joel Kamm, Newton, MA (US)

(73) Assignee: Flexetail, LLC, Newton, MA (US)

( * ) Notice: Subject to any disclaimer, the term of this patent is extended or adjusted under 35 U.S.C. 154(b) by 0 days.

(21) Appl. No.: 16/217,156

(22) Filed: Dec. 12, 2018

(65) Prior Publication Data
US 2019/0185081 A1     Jun. 20, 2019

Related U.S. Application Data

(60) Provisional application No. 62/598,631, filed on Dec. 14, 2017.

(51) Int. Cl.
| | | |
|---|---|---|
| *B62D 63/06* | (2006.01) | |
| *B60P 3/025* | (2006.01) | |
| *B62D 63/08* | (2006.01) | |
| *B62D 63/02* | (2006.01) | |
| *E04H 3/02* | (2006.01) | |

(52) U.S. Cl.
CPC .......... *B62D 63/061* (2013.01); *B60P 3/0257* (2013.01); *B62D 63/025* (2013.01); *B62D 63/08* (2013.01); *E04H 3/02* (2013.01)

(58) Field of Classification Search
CPC .... B62D 63/061; B62D 63/025; B62D 63/08; B62D 63/06; B62D 53/068; B62D 21/12; B62D 21/20; B60P 3/0257; B60P 1/025; B60P 3/07; E04H 3/02; B60G 17/0565; B60G 2500/30

USPC ..... 180/24.02; 280/6.151, 6.152, 6.153, 400, 280/415.1, 656, 789; 296/22, 168; 414/482

See application file for complete search history.

(56) References Cited

U.S. PATENT DOCUMENTS

| | | | | | |
|---|---|---|---|---|---|
| 3,993,342 | A | * | 11/1976 | Jones | ........................ B60P 3/07 410/24.1 |
| 4,019,773 | A | * | 4/1977 | Vehling | ................. B60P 3/0255 296/21 |
| 4,372,572 | A | * | 2/1983 | Verschage | ............ B62D 53/065 280/441.2 |
| 4,702,662 | A | * | 10/1987 | Marlett | .................. B60P 3/122 298/12 |
| 4,842,302 | A | * | 6/1989 | Lauronen | ............. B62D 61/125 180/24.02 |
| 4,881,859 | A | * | 11/1989 | Ehrlich | ..................... B60P 3/08 410/29.1 |
| 4,900,055 | A | * | 2/1990 | Wright | .................... B60G 5/00 280/124.169 |

(Continued)

*Primary Examiner* — Paul N Dickson
*Assistant Examiner* — Hilary L Johns
(74) *Attorney, Agent, or Firm* — Burns & Levinson, LLP; Joseph M. Maraia (57) ABSTRACT

A self-contained mobile retail store structure which is transportable from one location to another. The structure is mounted to a frame which is coupled to a plurality of wheels by a hydraulic system capable of raising, lowering, inclining and declining the structure relative to a ground surface. In a stationary position, the walls of the structure contact the ground surface, and in the transportable position, the walls of the structure are spaced from the ground surface. The mobile retail store structure of this disclosure fits in a standard-sized parking space, and may be configured with other similar structures to expand the retail area.

20 Claims, 6 Drawing Sheets

(56) References Cited

U.S. PATENT DOCUMENTS

| | | | |
|---|---|---|---|
| 4,958,874 A * | 9/1990 | Hegedus | B60P 3/0252 296/175 |
| 5,182,795 A | 1/1993 | Boutaud et al. | |
| 5,310,209 A * | 5/1994 | Holman | B60P 3/0255 280/43.1 |
| 6,182,795 B1 * | 2/2001 | Boerer | B60P 3/0257 186/52 |
| 7,618,227 B2 * | 11/2009 | Smith | B60P 1/027 280/414.5 |
| 7,802,958 B2 * | 9/2010 | Garcia | B60P 1/52 414/482 |
| 8,118,315 B2 * | 2/2012 | Mann | B60P 3/122 280/425.2 |
| 8,317,215 B2 * | 11/2012 | Quenzi | B60P 3/06 280/425.1 |
| 8,636,208 B2 * | 1/2014 | Urban | B60P 3/0257 235/383 |
| 9,340,087 B2 * | 5/2016 | Atkinson | B62D 33/023 |
| 9,340,138 B2 * | 5/2016 | Piekny | B60P 1/34 |
| 9,896,017 B1 * | 2/2018 | Requejo | B60P 3/34 |
| 10,005,383 B2 * | 6/2018 | Ellis | B60P 1/6454 |
| 10,269,273 B1 * | 4/2019 | Borden | E04B 1/34336 |
| 2002/0110442 A1 * | 8/2002 | Hurlburt | B62D 63/061 414/482 |
| 2005/0184485 A1 * | 8/2005 | Timmermans | B60P 1/027 280/656 |
| 2006/0115352 A1 * | 6/2006 | Brown | B60P 1/025 414/347 |
| 2014/0217701 A1 * | 8/2014 | Raemsch | B60P 3/42 280/415.1 |
| 2017/0158108 A1 * | 6/2017 | Elbaz | B60P 3/0255 |
| 2017/0233006 A1 * | 8/2017 | Gibson | B62D 63/062 280/789 |

* cited by examiner

MOBILE RETAIL STORE STRUCTURE

CROSS-REFERENCE TO RELATED APPLICATIONS

This application claims priority to and benefit of U.S. Provisional Application No. 62/598,631, filed Dec. 14, 2017, entitled MOBILE RETAIL STORE STRUCTURE, the contents of which are incorporated by reference herein in their entirety for all purposes.

FIELD

This disclosure relates generally to mobile retail stores and, more particularly, to a transportable trailer structure configured to house retail products.

BACKGROUND

Traditionally, retail stores have been located at fixed positions, including stand-alone stores, or stores that are part of a shopping center or mall. As such, it is necessary for customers to travel to these stores to buy merchandise. However, due to the costs of building, renting and maintaining store space, trucks and other mobile retail structures for providing limited retail services are often an attractive option to a retailer. Typically, the mobile retail structure is a vehicle which has been retrofitted to function as a retail store, often having racks or shelves secured along the inside walls of the structure for the display of consumer items.

Although shoppers may enjoy the novelty and convenience of a mobile store, there are many limitations inherent in these retail spaces. For example, a large mobile retail store may require a large set-up space, which may not be easily viewable or accessible by a potential customer. The retail structure may require significant amounts of time to set up and disassemble when the structure is moved from one location to another. Furthermore, many existing retail structures are difficult and expensive to move, and cannot be moved with a standard truck. Finally, current mobile retail structures are typically limited in their configurations, and cannot be customized by the retailer depending upon the application.

BRIEF SUMMARY

Described herein is a self-contained mobile retail store structure which is easily transportable from one location to another. The structure is mounted to a frame which is coupled to a plurality of wheels by a hydraulic system capable of raising, lowering, inclining and declining the structure relative to a ground surface. In a stationary position, the walls of the structure are adjacent to the ground surface, providing the consumer with easy access into the interior space. In the transportable position, the walls of the structure are spaced from the ground surface, making it easier for the structure to be transported. Advantageously, the mobile retail store structure of this disclosure fits into a standard-sized parking space, providing easy access to a consumer, and may be customizable by the retailer as desired.

Further examples of the mobile retail store structure of this disclosure may include one or more of the following, in any suitable combination.

In examples, the mobile retail store structure of this disclosure includes a base having a top, a bottom, a proximal end and a distal end. A body section has a floor portion coupled to the top of the base. The floor portion extends distally in angular direction such that a distance between the distal end of the base and the floor portion is greater than a distance between the proximal end of the base and the floor portion. The structure further includes at least one set of wheels configured to transport the body section, and a hydraulic system coupling the bottom of the base and the at least one set of wheels. The hydraulic system is configured to move the base from a transportable position, in which the floor portion is angled with respect to a ground surface and the distal end of the base is spaced from the ground surface, to a stationary position, in which the floor portion is substantially level with respect to the ground surface and the distal end of the base engages the ground surface.

In further examples of the structure, in the transportable position, at least a portion of the floor portion is level with or above a top surface of the at least one set of wheels and the base is substantially level with respect to the ground surface. In the stationary position, the floor portion extends below a top surface of the at least one set of Wheels and the base is angled with respect to the ground surface. In examples, an angle formed between the base and the ground surface is about 4 degrees. In further examples, the body section includes at least one side wall attached to the floor portion. At least a portion of the at least one sidewall extends below the floor portion toward the ground surface. In the transportable position, the portion a the at least one side wall is spaced from the ground surface. In the stationary position, the portion of the at least one side wall is adjacent the ground surface. In yet further examples, a length and width of the body section are selected to fit within a standard parking space. In examples, a length of the body section is about 16 feet and a width of the body is about 8 ½ feet. A greatest height of the body section is about 12 ½ feet. In examples, an angle formed between the floor portion and the base is about 4 degrees.

Examples of a method of moving the base of the mobile retail store structure from the transportable position to the stationary position a this disclosure include actuating the hydraulic system coupling the bottom of the base and the at least one set of wheels of the structure. Actuation of the hydraulic system causes the base to move from the transportable position, in which the floor portion is angled with respect to a ground surface and the distal end of the base is spaced from the ground surface, to the stationary position, in which the floor portion is substantially level with respect to the ground surface and the distal end of the base engages the ground surface.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The disclosure will be more fully understood by reference to the detailed description, in conjunction with the following figures, wherein.

DETAILED DESCRIPTION

In the description that follows, like components have been given the same reference numerals, regardless of whether they are shown in different examples. To illustrate example(s) in a clear and concise manner, the drawings may not necessarily be to scale and certain features may be shown in somewhat schematic form. Features that are described and/or illustrated with respect to one example may be used in the same way or in a similar way in one or more other examples and/or in combination with or instead of the features of the other examples.

As used in the specification and claims, for the purposes of describing and defining the invention, the terms "about" and "substantially" are used to represent the inherent degree of uncertainty that may be attributed to any quantitative comparison, value, measurement, or other representation. The terms "about" and "substantially" are also used herein to represent the degree by which a quantitative representation may vary from a stated reference without resulting in a change in the basic function of the subject matter at issue. "Comprise," "include," and/or plural forms of each are open ended and include the listed parts and can include additional parts that are not listed. "And/or" is open-ended and includes one or more of the listed parts and combinations of the listed parts. Use of the terms "right side" and "left side" herein is intended only to help in the clear description of the present disclosure and are not intended to limit the structure, positioning and/or operation of the doors, steps and/or awnings in any manner.

Figure 1:
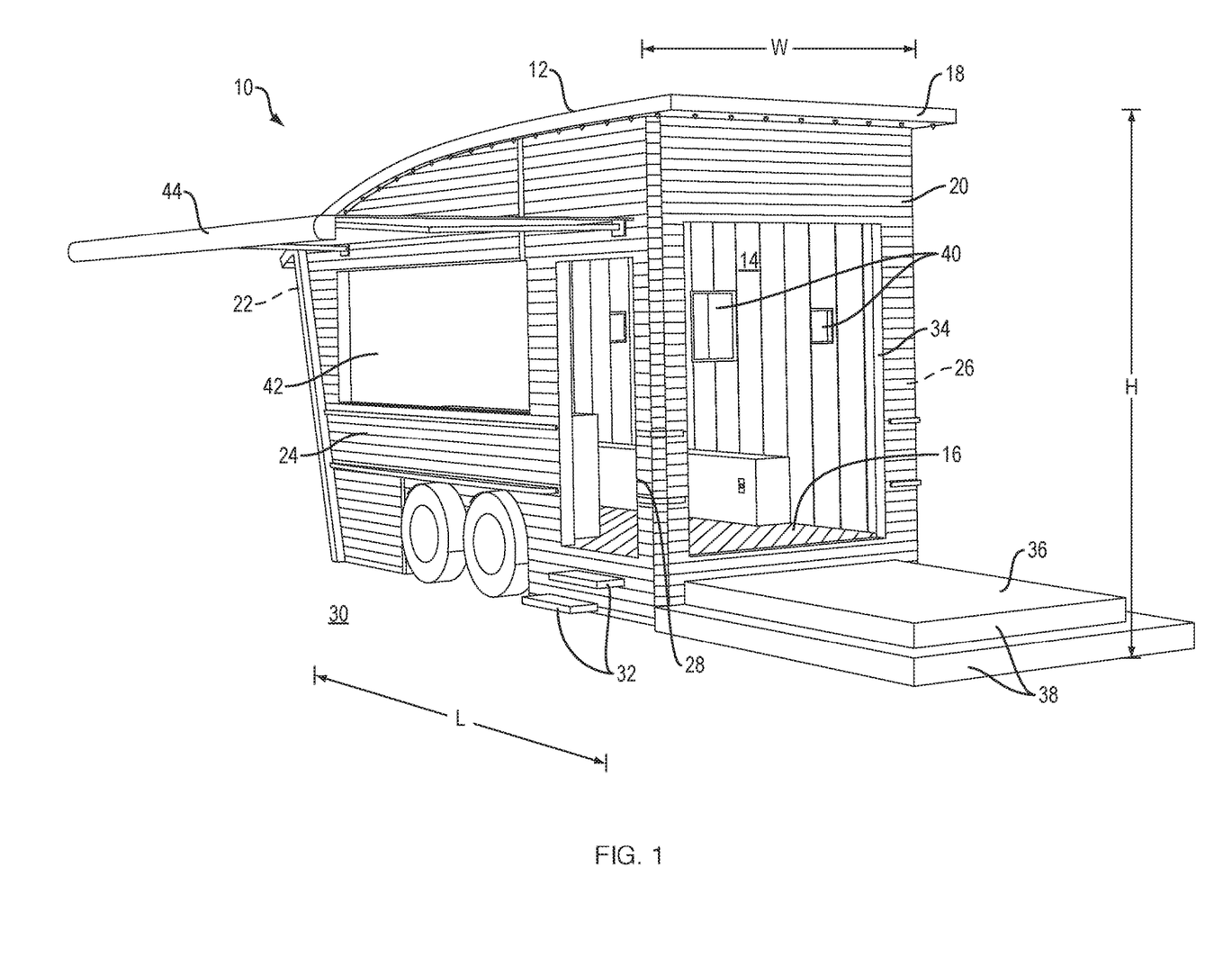
FIG. 1 is a perspective view of an exemplary mobile retail store structure of this disclosure in a stationary position.

Turning now to FIG. 1, an example of a mobile retail store structure 10 of this disclosure is illustrated in a stationary position. The structure 10 generally includes a trailer body 12 configured both exteriorly and interiorly for housing consumer goods. For example, an interior of the trailer body 12 may include shelves, bars, hooks, counters, seating and/or other structures convenient for the viewing and/or displaying of merchandise. In examples, the trailer body 12 may be made from metals or metal alloys selected for performance, strength and/or heat resistance, such as aerospace grade metals. An exterior of the trailer body 12 may be comprised of any suitable material, such as metal, wood, or combinations thereof, selected to provide an aesthetically pleasing appearance of the trailer body 12. Spaces for signage (not shown) may be included on the exterior of the trailer body 12, depending upon the application. Advantageously, the trailer body 12 of this disclosure is sized to fit into most standard parking spaces, which typically have a length of between 16 and 20 feet, and a width of between 8 and 10 feet. For example, a length L of the trailer body 12 may be about 16 feet and a width W of the trailer body 12 may be about 8 ½ feet. A greatest height H of the trailer body 12 may vary, but in general is sized to clear an overpass while being transported. In examples, the greatest height H of the trailer body 12 may be about 12 ½ feet. Preferably, a weight of the trailer body 12 is selected to allow the trailer body 12 to be maneuverable by hand within a selected parking space.

As further shown in FIG. 1, the trailer body 12 includes an interior space 14 surrounded and defined by an enclosure wall that includes a floor 16, a roof 18, a front wall 20, a rear wall 22, a right side wall 24 and an opposing left side wall 26. The roof 18 may be comprised of metal or any other suitable material. In examples, the floor 16 may be supported by a metal subfloor (not shown). Notably, when the trailer body 12 is in the stationary position, the floor 16 is spaced from the ground surface 30 such that portions of the front wall 20, the rear wall 22, the right side wall 24 and the left side wall 26 extend below the floor 16 toward the ground surface 30. A side door 28 is defined by the right side wall 24 of the trailer body 12 for entry into and exit from the interior space 14. When the trailer body 12 is in the stationary position, a bottom of the side door 28 may be about 14 inches from the ground surface 30. The trailer body 12 may also include a first plurality of steps 32 for providing access to the side door 28. In examples, the first plurality of steps 32 are manual, pull-out steps which may be optionally deployed when the trailer body 12 is in the stationary position.

Figure 2:
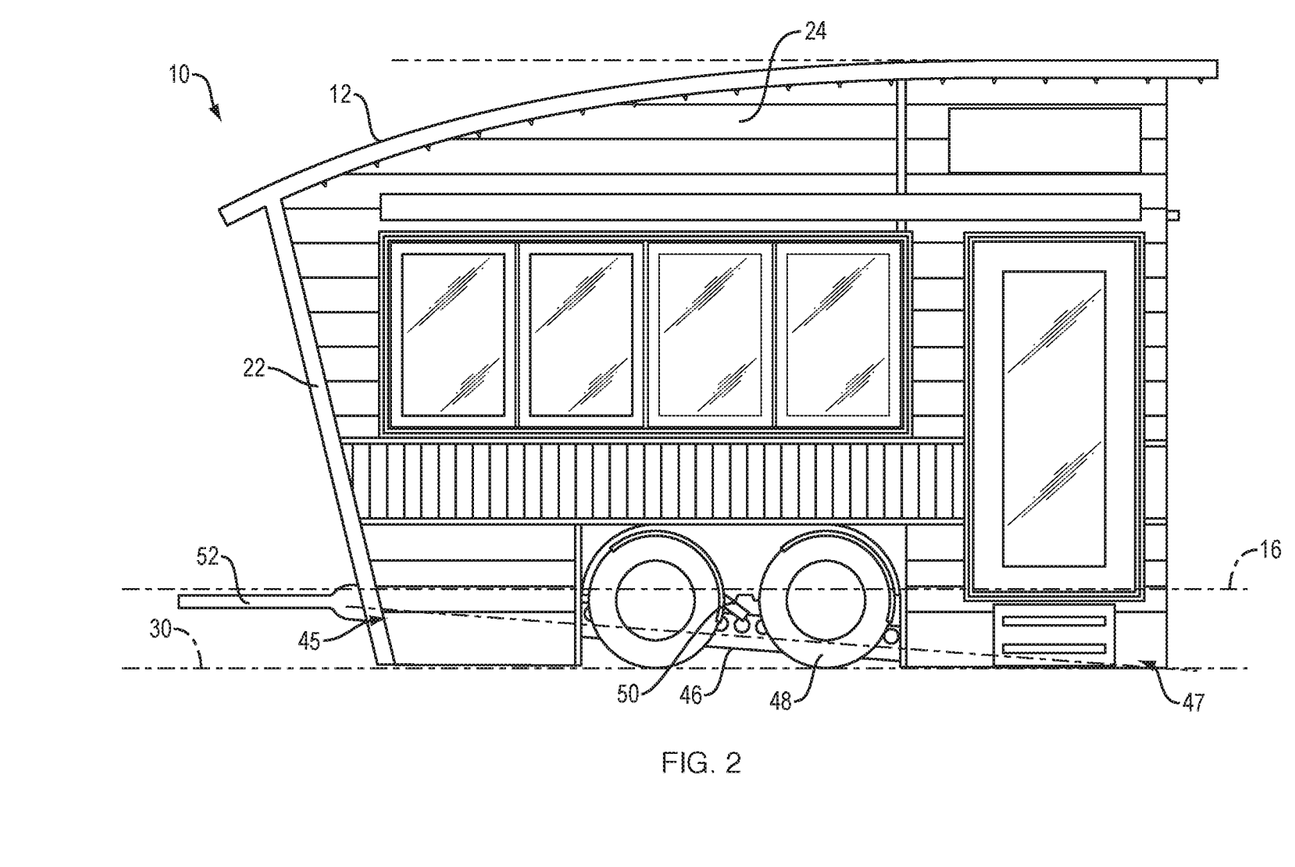
FIG. 2 is a side view of the mobile retail store structure of FIG. 1.

Still referring to FIG. 1, the trailer body 12 may also include a front door 34 defined by the front wall 20 of the trailer body 12 for entry into and exit from the interior space 14. In examples, the front door 34 may be a double "French door," known in the art. The structure 10 may also include a removeably attachable platform staircase 36 that is sized to be a comfortable stairway for people wishing to enter the trailer body 12. The staircase 36 includes a second plurality of steps 38 that extend substantially from about 6 inches below the front door 34 to the ground surface 30. When it is desired not to use the staircase 36, the staircase 36 is removed from the trailer body 12. In other examples, not shown, the staircase 36 may include a ramp portion for making the trailer body 12 accessible to wheelchairs or to consumers having other disabilities. The trailer body 12 may further include one or more stationary windows 40, which may be customizable in size, shape and location. In examples, the right side wall 24 of the trailer body 12 may define a service window 42, which may be enclosed with fold-out panels (FIG. 2). An extendable awning 44 may be associated with the service window 42. The awning 44 includes a framework that is both collapsible into a stored position and extendible into an expanded position for use. A flexible material or other suitable covering extends over the framework to complete the awning 44. The awning 44 is housed in its stored position within a channel, cavity, recess or other structure (not shown) adjacent the service window 42 in a conventional manner.

Further examples of the trailer body 12, not shown, may include an HVAC unit for providing heating, cooling and electrical power to the trailer body 12. A generator may supply the electrical power for operation of all systems housed within the trailer body 12 and may be stored with the HVAC system outside the confines of the interior space 14 of the trailer body 12 to conserve space, reduce interior noise and provide better ventilation for exhaust. The trailer body 12 may further be outfitted with communication systems, such as wireless local area networking (Wi-Fi), for the convenience of the consumer.

Turning now to FIG. 2, a view of the right side wall 24 of the trailer body 12 is illustrated in further detail, the left side wall 26 being substantially, with the exception of window and door placement, a mirror image thereof. As shown in FIG. 2, the structure 10 includes a frame 46 extending between a proximal end 45 and a distal end 47. The trailer body 12 is mounted on the frame 46 in an angled position such that a distance between the distal end 47 of the frame 46 and the floor 16 is greater than a distance between the proximal end 45 of the frame 46 and the floor 16. In examples, the angle formed between the frame 46 and the floor 16 is about 4 degrees. The frame 46 is mounted on a plurality of wheels 48 by means of a hydraulic system 50 coupled to the plurality of wheels 48 and to the frame 46. The hydraulic system 50 is configured to both raise and tilt the frame 46 with respect to the ground surface 30, as will be described in more detail below. The plurality of wheels 48 may include at least a set of four wheels arranged with two wheels in tandem on opposing sides on the trailer body 12. The proximal end 45 of the frame 46 may further include a hitch 52 for attachment to a transportation vehicle. The transportation vehicle can be any vehicle having its own integral means of propulsion, such as a car, an RV-type vehicle, a bus, or a truck. The hitch 52 may be provided with a pivotable support member (not shown) for stabilizing the hitch 52 against the ground surface 30 when the structure 10 is in the stationary position.

Figure 3A:
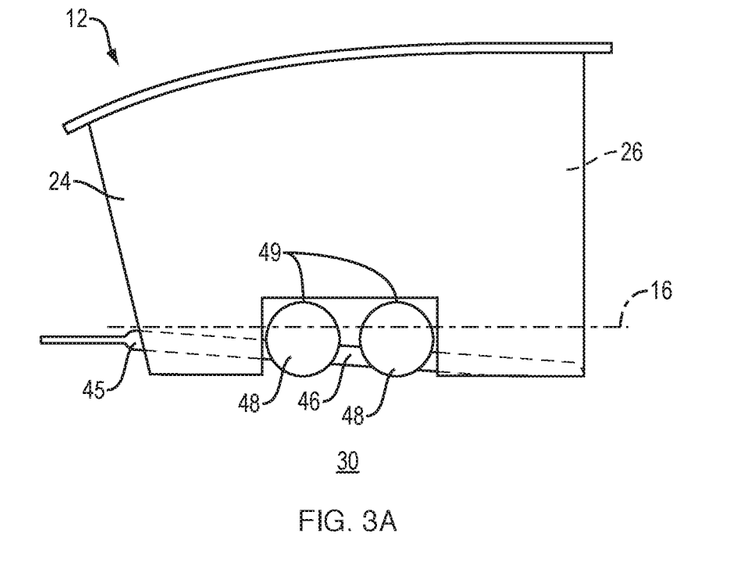
FIGS. 3A and 3B are schematic illustrations of the mobile retail store structure of FIG. 1 in the stationary position (FIG. 3A) and in the transportable position (FIG. 3B)
Figure 3B:
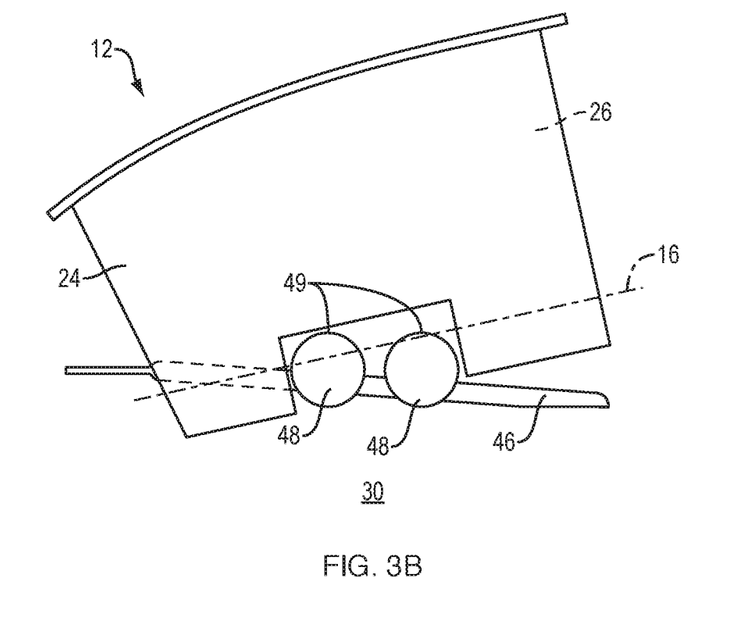

As shown in FIG. 3A, when the trailer body 12 is in the stationary position, the floor 16 is substantially level with respect to the ground surface 30, even when the ground surface 30 is uneven. Additionally, in the stationary position, the frame 46 is angled from the ground surface 30 such that the distal end 47 of the frame 46 engages the ground surface 30 and the proximal end 45 of the frame 46 is spaced from the ground surface 30. In examples, the angle formed between the frame 46 and the ground surface 30 is about 4 degrees. The floor 16 furthermore extends between the opposing pairs of plurality of wheels 48 and below a top surface 49 of the plurality of wheels 48, while portions of the side walls 24, 26 extend below the floor 16 to be adjacent the ground surface 30 on either side of the plurality of wheels 48. As shown in FIG. 3B, when the trailer body 12 is in the transportable position, at least a portion of the floor 16 is level with or above the top surface 49 of the plurality of wheels 48, and the portions of the side walls 24, 26 extending below the floor 16 are spaced from the ground surface 30. Furthermore, the frame 46 is substantially level with respect to the ground surface 30 while the floor 16 is angled with respect to the ground surface 30.

Figure 4:
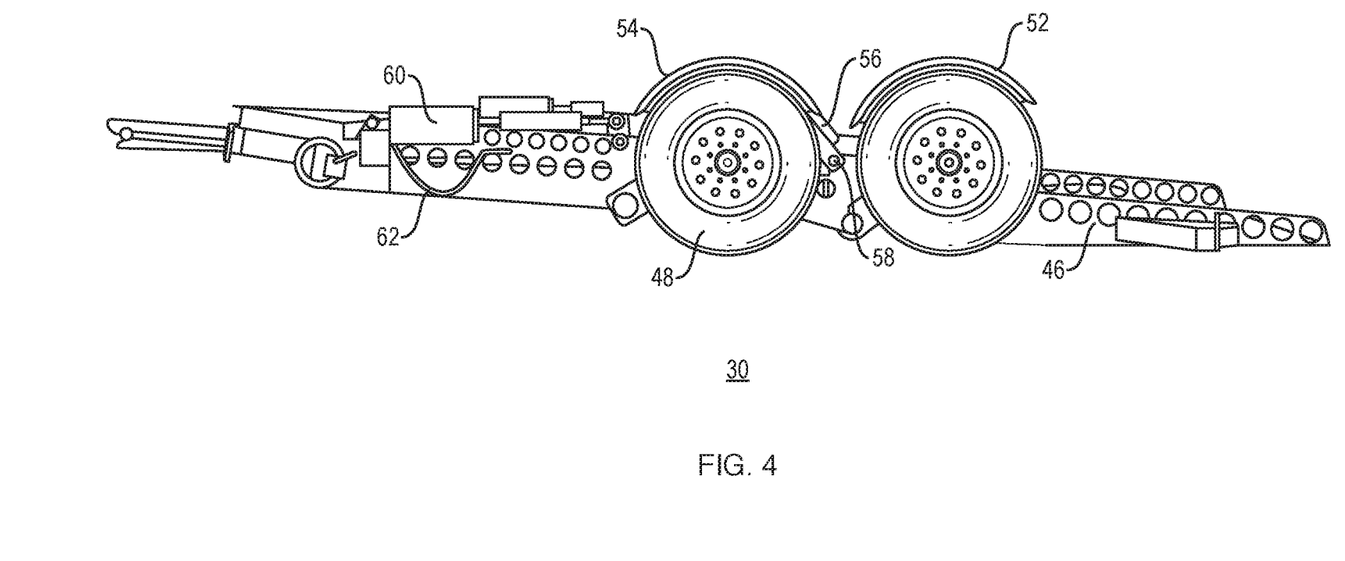
FIG. 4 illustrates an example of a hydraulic system used to elevate, de-elevate, incline or decline the mobile retail store structure of FIG. 1.

FIG. 4 illustrates an example of a hydraulic system 50 used to elevate, de-elevate, incline or decline the mobile retail store structure 10 of this disclosure. The hydraulic system 50 may be modified from one of a number of commercially available hydraulic systems 50 used to elevate, de-elevate, incline or decline a trailer bed, such as the hydraulic system disclosed in U.S. Pat. No. 7,618,227, assigned to The Advance Metal Working Company, Inc. (Kewanee, Ill.), incorporated herein by reference. Examples of the hydraulic system 50 may comprise component parts such as wheel supports 54, adjustable arms 56, joints 58, hydraulic cylinders 60, and hydraulic tubing 62 attaching the frame 46 to the plurality of wheels 48. By coordinating the movement of the component parts, the frame 46 can be inclined, declined, elevated, de-elevated, or any combination thereof, relative to the ground surface 30.

Figure 5:
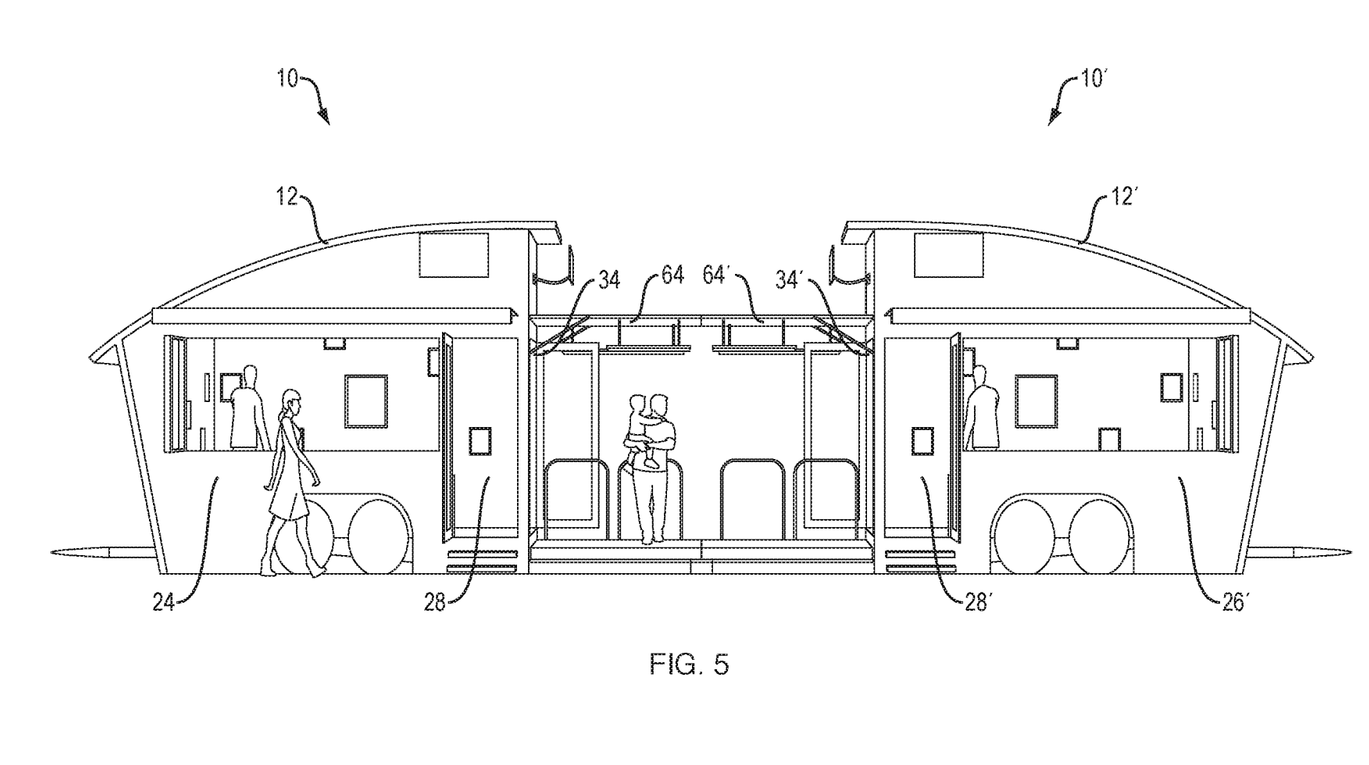
FIGS. 5 and 6A-C illustrate a plurality of mobile retail store structures used in tandem to increase the available retail space.

Turning now to FIG. 5, the mobile retail store structure 10 of this disclosure may be used in tandem with another structure 10' to increase the amount of retail space available to the merchandiser. In the example of FIG. 5, the side door 28 is associated with the right side wall 24 of trailer body 12 and the side door 28' is associated with the left side wall 26' of trailer body 12'. In this configuration, each trailer body 12, 12' includes a front door 34, 34' positioned and located in opposed relationship to each other. Extendable awnings 64, 64' may be associated with the front doors 34, 34' to protect the passageway extending between the trailer bodies 12, 12'.

Figure 6A:
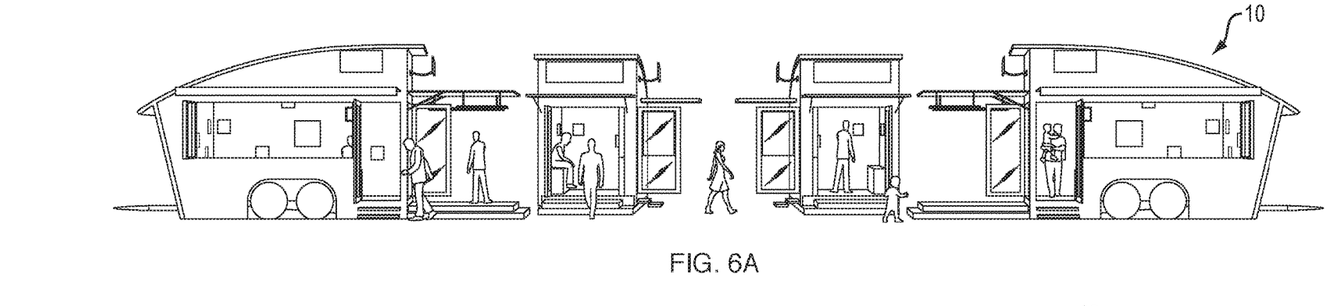
Figure 6B:
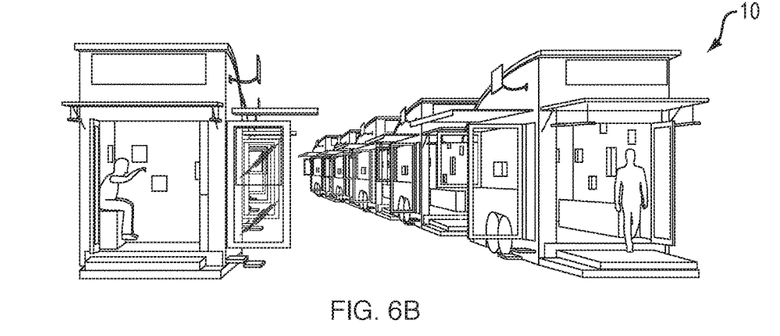
Figure 6C:
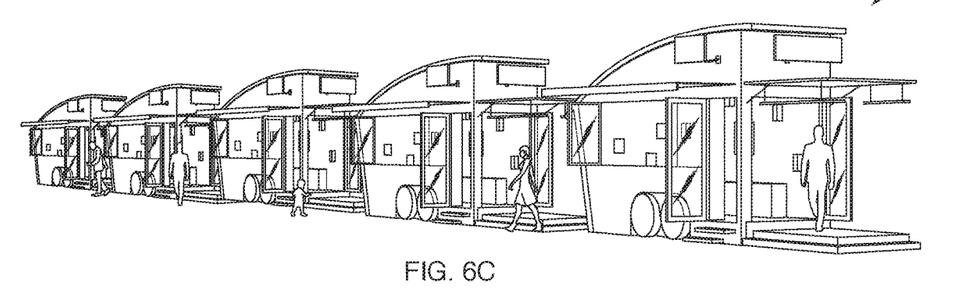

Advantageously, the trailer bodies 12, 12' can be individually moved from one location to another and can be assembled and disassembled more rapidly than typical mobile stores. Furthermore, the interior of each individual trailer body 12, 12' can be configured differently depending upon the particular application. Multiple retail store structures 10 can also be arranged into "villages" examples of which are shown in FIGS. 6A-C.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting, the full scope rather being conveyed by the appended claims.

What is claimed is:

1. A mobile retail store structure transportable to a plurality of locations, the structure comprising:
   a base including a top, a bottom, a proximal end and a distal end;
   a body section having a floor portion coupled to the top of the base, the floor portion extending distally in angular direction such that a distance between the distal end of the base and the floor portion is greater than a distance between the proximal end of the base and the floor portion;
   at least one set of wheels configured to transport the body section; and
   a hydraulic system coupling the bottom of the base and the at least one set of wheels;
   wherein the hydraulic system is configured to move the base from a transportable position, in which the floor portion is angled with respect to a ground surface and the distal end of the base is spaced from the ground surface, to a stationary position, in which the floor portion is substantially level with respect to the ground surface and the distal end of the base engages the ground surface.

2. The structure of claim 1, wherein, in the transportable position, at least a portion of the floor portion is level with or above a top surface of the at least one set of wheels.

3. The structure of claim 1, wherein, in the transportable position, the base is substantially level with respect to the ground surface.

4. The structure of claim 1, wherein, in the stationary position, the floor portion extends below a top surface of the at least one set of wheels.

5. The structure of claim 1, wherein, in the stationary position, base is angled with respect to the ground surface.

6. The structure of claim 5, wherein an angle formed between the base and the ground surface is about 4 degrees.

7. The structure of claim 1, wherein the body section further comprises at least one side wall attached to the floor portion, at least a portion of the at least one sidewall extending below the floor portion toward the ground surface.

8. The structure of claim 7, wherein, in the transportable position, the portion of the at least one side wall is spaced from the ground surface.

9. The structure of claim 7, wherein, in the stationary position, the portion of the at least one side wall is adjacent the ground surface.

10. The structure of claim 1, wherein a length and width of the body section are selected to fit within a standard parking space.

11. The structure of claim 1, wherein a length of the body section is about 16 feet and a width of the body is about 8 ½ feet.

12. The structure of claim 1, wherein a greatest height of the body section is about 12 ½ feet.

13. The structure of claim 1, Wherein an angle formed between the floor portion and the base is about 4 degrees.

14. A method of moving a base of a mobile retail store structure from a transportable position to a stationary position, the base comprising, a top, a bottom, a proximal end and a distal end, and the structure having a floor portion coupled to the top of the base, the method comprising:
actuating a hydraulic system coupling a bottom of the base and at least one set of wheels of the structure;
wherein actuation of the hydraulic system causes the base to move from the transportable position, in which the floor portion is angled with respect to a ground surface and the distal end of the base is spaced from the ground surface, to the stationary position, in which the floor portion is substantially level with respect to the ground surface and the distal end of the base engages the ground surface.

15. The method of claim 14, wherein, in the transportable position, at least a portion of the floor portion is level with or above a top surface of the at least one set of wheels.

16. The method of claim 14, wherein, in the transportable position, the base is substantially level with respect to the ground surface.

17. The method of claim 14, wherein, in the stationary position, the floor portion extends below a top surface of the at least one set of wheels.

18. The method of claim 14, wherein, in the stationary position, base is angled with respect to the ground surface.

19. The method of claim 18, wherein an angle formed between the base and the ground surface is about 4 degrees.

20. The method of claim 14, wherein an angle formed between the floor portion and the base is about 4 degrees.

* * * * *